March 31, 1970     S. KURLANDSKY     3,503,579
CHAIN FOR SUPPORTING FLEXIBLE CONDUIT
Filed Aug. 30, 1967     3 Sheets-Sheet 1
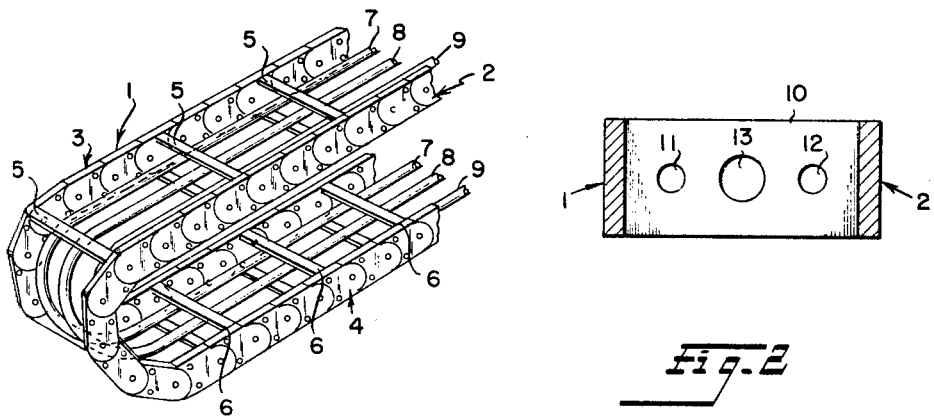
fig.1
fig.2
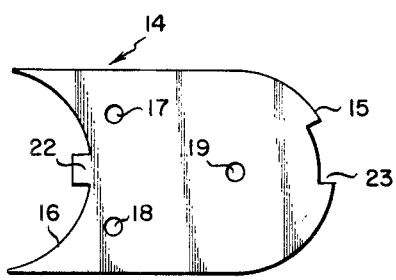
fig.3
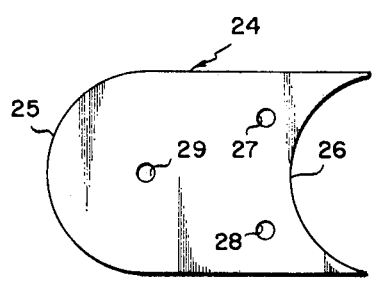
fig.4
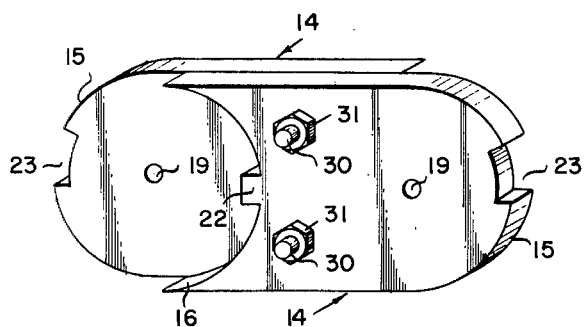
fig.5
INVENTOR
Sam Kurlandsky
BY Hueschen & Kurlandsky
ATTORNEYS March 31, 1970  S. KURLANDSKY  3,503,579
CHAIN FOR SUPPORTING FLEXIBLE CONDUIT
Filed Aug. 30, 1967
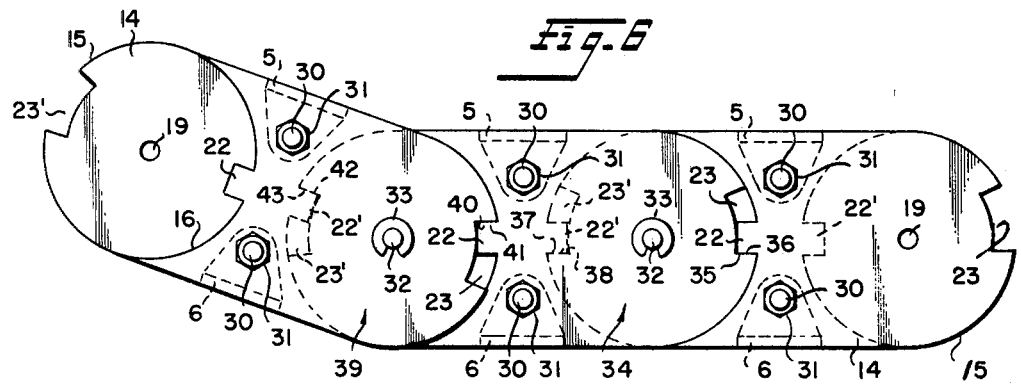
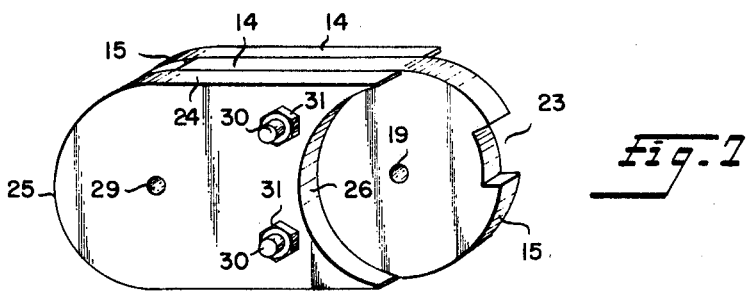
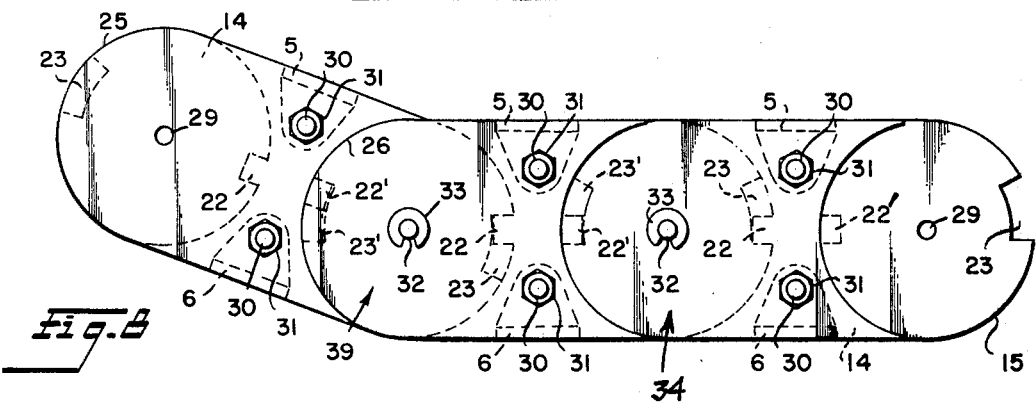
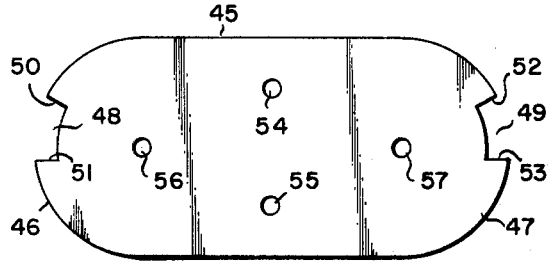
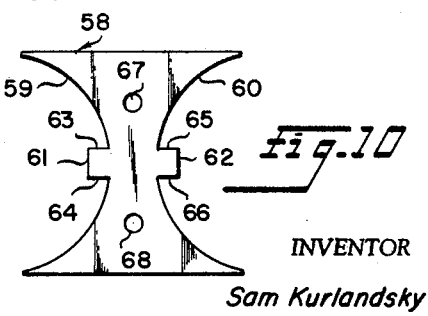
INVENTOR
Sam Kurlandsky
ATTORNEYS

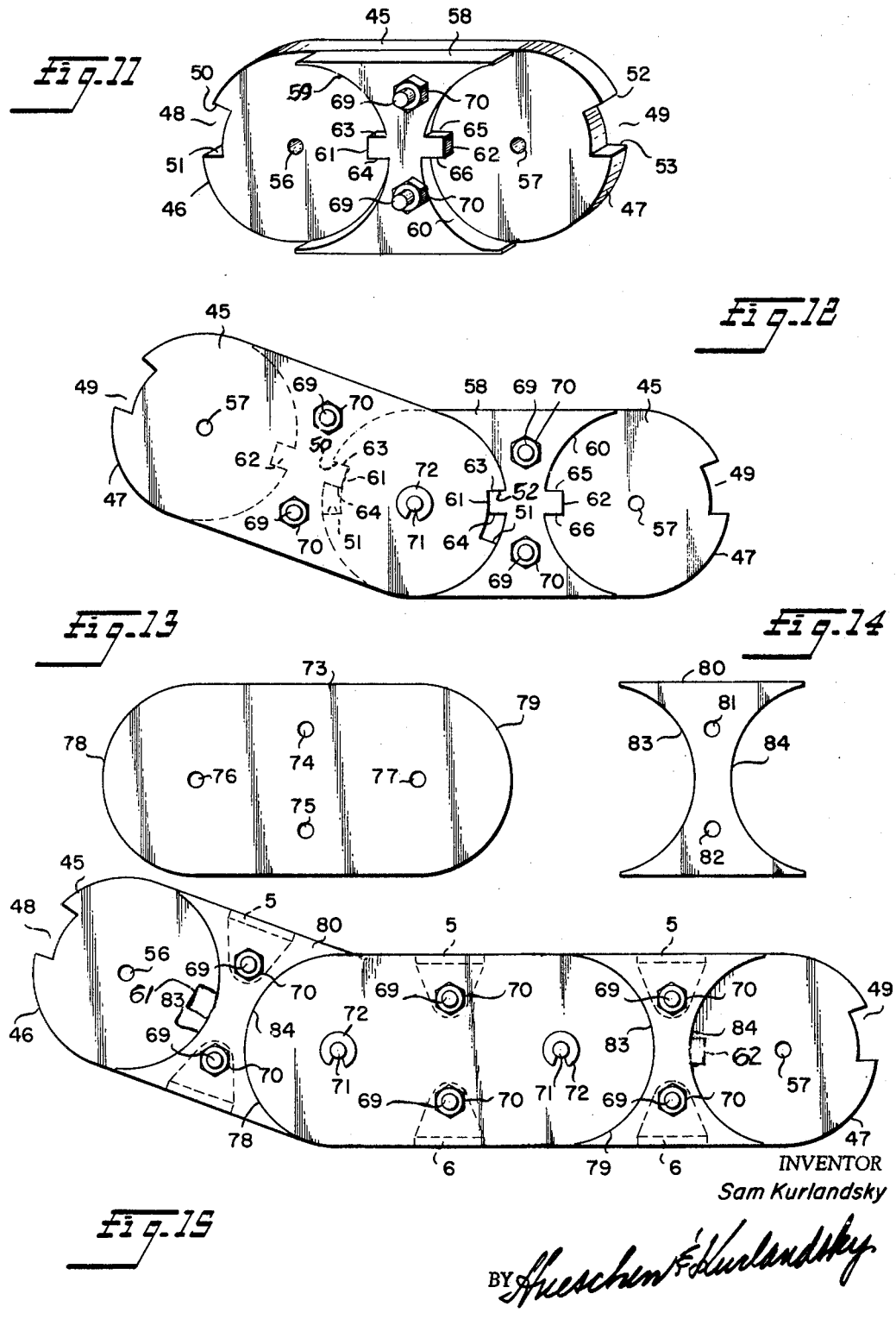

United States Patent Office 3,503,579
Patented Mar. 31, 1970

3,503,579
CHAIN FOR SUPPORTING FLEXIBLE CONDUIT
Sam Kurlandsky, Kalamazoo, Mich., assignor to Aero-Motive Mfg. Co., Kalamazoo, Mich., a corporation of Michigan
Filed Aug. 30, 1967, Ser. No. 664,512
Int. Cl. F16l *3/00*
U.S. Cl. 248—51       35 Claims

ABSTRACT OF THE DISCLOSURE

A chain for supporting flexible conduit formed of links, pivotally interconnected at their ends, and having two limit tabs and two complementary arcuate notches providing limiting positions of pivotal movement between the links of the chain, and providing double support at each limiting position to limit or prevent the imposition of shear force at the pivotal point.

BACKGROUND OF THE INVENTION

The present invention relates to chains and is more particularly concerned with a chain designed to support flexible conduits such as electrical cables and fluid conducting hoses which transport electricity and/or fluids to a movable station.

Apparatus has been disclosed in the prior art adapted to support conduits for electrical current, or liquid or gaseous media to stations which are adapted to move, particularly in a straight line, as for example large machine tools and cranes. Such apparatus utilizes one or more chains comprised of a plurality of interconnected links and having supporting means for the conduit.

Pivotal movement between the links is limited in one direction to a point where the links lie in a straight line and in the other position at an acute angle. Consequently, when in one position the chain is self-supporting in a straight line. Moreover, when turned in the other direction, the chain is self-supporting at a curvature having a predetermined radius. The chain is normally mounted with one end attached to a fixed station and the other attached to a station movable along a straight line path. The chain is normally arranged to extend as a horizontal U between the fixed station and the movable station and in some embodiments is completely self-supporting. In other embodiments a supporting track or bed may be utilized. In most applications two parallel chains held in spaced apart relationship by conduit-supporting members are used.

Prior art chains as described above, although they are generally satisfactory in carrying out their function of supporting cables and conduits, are subject to the disadvantage that in each limiting position a substantial shear force is exerted on the pivot pin at each joint, thereby causing it to wear rapidly and to cause the apparatus to fail. This is particularly true when an operator stands upon the horizontal self-supporting portion of the chain, even though infrequently, during operation or maintenance. An additional disadvantage of some prior art chain supports is that the chains are complicated and expensive to produce.

SUMMARY OF THE INVENTION

It is an object of the invention to provide a chain support for flexible conduit which is self-supporting and is not necessarily supported by means of tracks. It is an additional object to provide a chain support of the type described which is relatively simple and inexpensive to build. It is a further object to provide a supporting chain wherein each pair of links is pivotal between two limiting positions, and wherein the shear force on the pivot is substantially reduced or even completely eliminated. It is a further object to provide a chain support wherein the chain links are fully covered, thereby protecting the operator and preventing foreign particles from entering and causing the chain to fail. The accomplishment of the foregoing and additional objects will become more fully apparent hereinafter.

According to the invention, a chain support for flexible conduit is provided comprised of a plurality of interconnected links each adjacent pair of links being adapted to pivot at their ends between two limiting positions. In a preferred embodiment, the limits are so designed that the chain is horizontal in one limiting position, and curved about a predetermined radius of curvature at the other limit. The interconnected ends of each pair of adjacent links are provided with two limit tabs and two complementary peripheral arcuate notches. The limit tabs are each provided with two limiting surfaces along its sides and the notch is provided with a limiting surface at each end. The tabs and notches are so positioned and dimensioned that at each limiting position a point of support is provided on each side of the pivot point, thereby greatly reducing or completely eliminating the application of shear force on the pivot.

BRIEF DESCRIPTION OF THE DRAWING

The invention in its preferred embodiments is illustrated by the accompanying drawings in which:

FIG. 1 is a perspective view of a chain support assembly and supported conduits.

FIG. 2 is a cross-sectional view through a chain support assembly having a somewhat modified transverse supporting member.

FIG. 3 is a plan view of a plate which may be used for assembling a chain link according to the invention.

FIG. 4 is a plan view of a modified plate which may be used as the outer plate of the chain link.

FIG. 5 is a perspective view of a chain link formed from two plates as shown in FIG. 3.

FIG. 6 is an elevational view of a segment of a chain support formed of links according to FIG. 5.

FIG. 7 is a perspective view of a chain link formed of two plates as shown in FIG. 3 and one plate as shown in FIG. 4.

FIG. 8 is an elevational view of a segment of chain support formed of links as shown in FIG. 7.

FIG. 9 is a plan view of a plate for forming another embodiment of the invention.

FIG. 10 is a plan view of an insert for use in combination with the plate of FIG. 9.

FIG. 11 is a perspective view of a chain link formed of a plate according to FIG. 9 and an insert according to FIG. 9.

FIG. 12 is an elevational view of a chain segment formed of two links according to FIG. 11.

FIG. 13 is a plan view of a cover plate for forming a chain according to a somewhat modified embodiment.

FIG. 14 is a plan view of an insert plate designed to be utilized in conjunction with the plate of FIG. 13; and FIG. 15 is an elevational view of a chain support segment formed of links assembled by utilizing the links shown in FIG. 11 together with the plates of FIGS. 13 and 14.

Reference is now made to the accompanying drawings for a better understanding of the invention, wherein all the parts are numbered and wherein the same numbers are used to refer to the same parts throughout.

Referring to FIG. 1, a chain support according to the invention is shown together with supported conduits, and comprises lateral chains 1 and 2 each comprised of a plurality of pivotally interconnected links 3 and 4, respectively. The lateral chains 1 and 2 are connected together at intervals by transverse supporting members 5 and 6. A plurality of conduits 7, 8, and 9 are supported between the supporting members 5 and 6. Alternatively, as shown in FIG. 2, single supporting members 10 may be utilized having openings 11, 12, and 13 provided therein through which the conduits extend. The supporting members, whether those of FIG. 1 shown by the numerals 5 and 6 or those of FIG. 2, may be affixed either at each link of the chain or may be spaced one or more links apart.

FIGS. 3 and 4 illustrate basic plates which may be utilized to form links constituting several embodiments of the present invention. FIG. 3 illustrates a plate having a sheet-form body 14, a convexly arcuate end 15, and a concavely arcuate end 16, mounting holes 17 and 18, and a pivot pin hole 19. Additionally the plate has a limit tab 22 positioned at the concave end 16 and a complementary arcuate notch 23 positioned at the convex end 15 and adapted to engage the limit tab 22 of an adjacent link.

FIG. 4 illustrates an outer plate similar in form to that of FIG. 3 but having no limit tabs or arcuate notches, and designed to shield the tabs and notches of inner-lying plates. The plate comprises a sheet-form body 24 having a convexly arcuate end 25 and a concavely arcuate end 26, mounting holes 27 and 28, and a pivot pin hole 29. The outer plate may be utilized in conjunction with two inner plates shown in FIG. 3 and serves to shield the chain from the entrance of foreign particles.

FIG. 5 illustrates a two-plate link prepared by affixing two inner plates as shown in FIG. 3 by means of bolts 30 and nuts 31. The plates are oriented in opposite directions and the concave end of one plate overlaps the concave end of the other. Moreover, the arrangement is such that, at each end of the link, the concave end 16 of one plate and the convex end 15 of the other plate are contiguous with the surface of a common imaginary cylinder whose axis passes through the center of the pivot hole 19.

FIG. 6 illustrates a chain support formed of two chains, one on each side formed of links such as illustrated in FIG. 5, by inserting pivot pins 32 through the pivot pin holes 19 and securing the pivot pins by retaining washers. Additionally transverse supporting members 5 and 6 are affixed to the upper and lower edges, respectively, of each chain by means of bolts 30 and nuts 31. As can be seen in FIG. 6, at pivotal joint number 34 the lateral limiting surface 35 of the tab 22 shown in solid lines engages the limiting surface 36 at the lower end of the notch 23. In similar manner, with regard to the plate on the other side shown in dotted lines, the limiting surface 37 of the tab 22' engages the lower limiting surface 38 of the notch 23'. Thus in the limiting position in which the links are in a straight line there are two points, one on each side of the pivot pin 32, opposing the pivotal force. Consequently, substantially all shear force is removed from the pin 32. In similar manner, in the other limiting position, as shown at joint 39, the upper lateral limiting surface 40 of the tab 22 engages the limiting surface 41 at the upper end of the notch 22, while the upper limiting surface 42 of the tab 22' engages the limiting surface 43 at the upper end of the notch 23'. Consequently, in this limiting position there are also two supports, one on each side of the pivot pin 32 to prevent any shear force from being exerted on the pin. As a result of the structure, the pivot pins suffer little or no wear during operation of the chain support.

FIG. 7 illustrates a chain link formed of two plates 14, as shown in FIG. 3, bolted together with one outer plate 24, as shown in FIG. 4. In this structure the outermost plates 14 and 24 are superposed and the other plate 14 is disposed intermediate the two outermost plates and directed in opposite direction. The concave end of the innermost plate is overlapped by and affixed to the concave ends of the outermost plates by means of bolts 30 and nuts 31. In the preferred embodiment as shown, at one end of the link the convex surface 15 of the intermediate plate and the concave surfaces 16 and 26 of the outermost plates are contiguous with the surface of an imaginary cylinder whose axis passes through the center of the pivot hole 19. In similar manner, the convex ends 15 and 25 of the outermost plates and the concave end 16 of the intermediate plate are substantially contiguous with the surface of a cylinder whose axis passes through the center of the pivot holes 19 and 29. As a result of this structure, when the links are formed into a chain, as shown in FIG. 8, the convex ends of each plate in a row nest with the concave ends of adjacent plates and thus form a chain which is completely enclosed and shielded on the outside.

Alternatively, the outer plate 24 can be superposed over the intermediate plate 14. Additionally a fourth plate 24 may be superposed over the outer plate 14 to provide a chain which is completely shielded on both sides.

The three plate links shown in FIG. 7 may be assembled to form a chain by inserting the convex end 15 of the intermediate plate 14 between the convex ends 15 and 25 of the outermost plates, inserting a pivot pin 32 in the pivot pin holes 19 and 29, and retaining the pivot pin 32 in place by means of a retaining washer 33. A chain support so formed of interconnected links is shown in FIG. 8. The functional operation of the chain is precisely the same as that of the chain shown in FIG. 6. However, because of the additional outer layer of plates 24, the detents and notches of the chain are completely enclosed by the plates, thereby avoiding the possibility of injury to the operator or the entrance of foreign particles into the internal mechanism of the chain.

FIGS. 9–12 illustrate another embodiment of the invention. In this embodiment, a plate 45 is utilized having two convexly arcuate ends 46 and 47, which are provided with peripheral arcuate notches 48 and 49 having limiting surfaces 50, 51, 52, and 53 at the ends of the notches. The plate is additionally provided with mounting holes 54 and 55 and pivot pin holes 56 and 57.

An insert plate or member 58, shown in FIG. 10, is used in combination with the plate of FIG. 9 to form a link. The insert plate has two concave ends 59 and 60 and limit tabs 61 and 62 having lateral limiting surfaces 63, 64, 65, and 66. Mounting holes 67 and 68 are provided for mounting the insert over the plate of FIG. 9.

FIG. 11 illustrates a link formed by affixing the insert member 58 to the plate 45 by means of bolts 69 and nuts 70. This structure is so designed that at one end the concave surface 59 and the convex surface 46 are contiguous with the surface of an imaginary common cylinder having its axis passing through the center of the pivot hole 56, and the concave end 60 and the convex end 47 are contiguous with the surface of a common imaginary cylinder having its axis passing through the center of the pivot hole 57. As a result of this structure, the convex ends of one link mate perfectly with the concave ends of the inserts of adjacent links, thereby completely covering the moving surfaces during pivotal motion.

FIG. 12 illustrates a chain segment formed of two links according to FIG. 11 joined together by means of a pivot pin 71 retained in place by means of a retaining washer 72. The links are shown in the pivotal limiting position in which the links are disposed at an angle less than 180° with respect to each other. In this position the limiting surface 63 of the tab 61 engages the limiting surface 50 of the slot 48, while at the other side of the pivot pin 71 the limiting surface 63 of the tab 61 engages the limiting surface 50 of the slot 48. Consequently points of support are provided on each side of the pivot pin 71, thereby removing any shear force from the pin. In similar manner (not shown), when the links are placed in their other pivotal limiting position with respect to each other, the limiting surface 64 of the tab 61 engages the limiting surface 51 of the slot 48 and the limiting surface 64 of the tab 61 engages the limiting surface 51 of the slot 48 also to provide a point of support on each side of the pivot pin, thereby also removing shear force therefrom. Consequently, in each limiting position there are two points of support, and no substantial shear force is exerted on the pivot pin in either limiting position.

FIGS. 13, 14, and 15 illustrate a modification of the embodiment of FIGS. 9–12. In this modification, a plate 73 is added having a size and shape similar to that of FIG. 9. The plate has mounting holes 74 and 75, and pivot pin holes 76 and 77, but the convex ends 78 and 79 are free of notches. Additionally, as shown in FIG. 14, an insert member 80 is utilized having mounting holes 81 and 82, with concave ends 83 and 84 free of limiting tabs.

FIG. 15 illustrates a chain support segment formed by placing a plate of FIG. 13 and two insert members of FIG. 14 in superposition with corresponding parts on one surface of a chain formed of links according to FIG. 11. The function and operation of the chain are identical with that of the chain of FIG. 12. However, the plate 73 and insert members 80 provide a complete cover for the tabs and notches on one side of the chain, thereby preventing injuries to the operator and preventing foreign particles from entering into the mechanism. If desired, plates 73 and insert members 80 may be additionally added to the other side of the chain to provide a completely shielded chain.

In the embodiments shown in the drawings, peripheral notches have been provided at the periphery of the convex ends of the parts and limiting tabs have been provided at the periphery of the concave ends. However, it will of course be understood that this structure could be reversed so that the convex ends are provided with tabs and the concave ends with notches. Moreover, the arrangement may be varied so that some of the convex ends have notches while others have tabs, and wherein some of the concave ends have notches and others tabs.

The supporting chain structure of the present invention has a number of advantages over prior art structures. First, in addition to providing all the necessary functions of conduit support for the particular application, that is, providing two limits of pivotal movement between the two links so that the chain is self-supporting when extended horizontally at one limit, and self-supporting about a defined radius of curvature at the other limit, the present structure provides two points of support at opposite sides of the pivot point for each limiting position, thereby greatly reducing the shear force against the pivot pin where such a pin is used and preventing rapid wear of the pivot pin and associated bearing structures. Moreover, the limiting surface structure may be so designed that all shear force is removed from the pivot structure at the limiting positions. So precise may the present structure be constructed that in some cases the pivot pin may be completely obviated. The present structure has the further advantage that, because the links have mating convex and concave ends in the one embodiment and mating convex and concave surfaces between the plate ends and the insert surfaces in the other embodiment, the moving edges of the chain are completely shielded, and the possibility of injuries to the person of the operator removed. Moreover, because the chain in most of its embodiments is completely enclosed, it is virtually impossible for foreign particles such as metal turnings to become ensnared in the chain and thereby enter inside the chain and cause failure of operation. As a further advantage, the chain is made of simply cut and drilled flap plates which may be readily assembled and readily dismantled for repair or link replacement.

Although the structure of the present invention has been shown and described in relation to the use of metal plates, plastic plates may be substituted for many applications. Moreover, instead of using flat plates, unitary plastic or molded metal links may be utilized instead of links prepared by bolting together two or more plates.

Although in the embodiments described and shown in the drawings each link is comprised of only two or three plates, it is of course to be understood that 4, 5, 6, or even more plates may be utilized for certain purposes and are to be considered as falling within the invention disclosed and claimed. For example, additional plates may be utilized to give greater strength to each link. Additional plates having limit means may be utilized to provide greater strength at the limiting positions. Alternatively, very thin plates may be utilized at the outside of the link to serve as a cover or shield for the slots, notches, etc., which comprise the limit means. Additionally, instead of complete plates, partial plates may be utilized to cover the slots, notches, etc., which remain exposed, as for example, when only two plates are utilized in a link.

It is to be understood that the invention is not limited to the exact details of construction, operation, or exact materials or embodiments shown and described, as obvious modifications and equivalents will be apparent to one skilled in the art.

I claim

1. A support for a flexible conduit, said conduit being adapted to be operated with one end connected to a fixed station and the other end connected to a movable station, said support comprising at least one chain having conduit supporting means affixed thereto, said chain comprising a plurality of interconnected links, pivot means defining a pivotal point common to and connecting together the ends of each pair of adjacent links to provide a pivotal movement with respect to each other, each pivotal end of each link being provided with a limit tab having limiting surfaces on both sides thereof and spaced from said pivot means and means defining a pair of spaced-apart limiting surfaces spaced from said pivot means, said tabs being an integral extension of and being coplanar with said links, the tab of the first of said pair of adjacent links being disposed intermediate the spaced-apart limiting surfaces of the second link, and the tab of the second link being disposed intermediate the spaced-apart limiting surfaces of the first link, at each limiting position of pivotal movement a limiting surface of each tab engaging one of the limiting surfaces intermediate which it is disposed, thereby providing two points of support about said pivot means and reducing the shear force applied to said pivot means.

2. A support for a flexible conduit, said conduit being adapted to be operated with one end connected to a fixed station and the other end connected to a movable station, said support comprising a pair of chains having conduit supporting means intermediate and affixed to said chains and maintaining said chains in parallel spaced-apart relationship, each of said chains comprising a plurality of interconnected links, pivot means defining a pivotal point common to and connecting together the ends of each pair of adjacent links to provide pivotal movement with respect to each other, each pivotal end of each link being provided with a limit tab having limiting surfaces on both sides thereof and spaced from said pivot means and being provided with means defining a pair of spaced-apart limiting surfaces spaced from said pivot means, said tabs being an integral extension of and being coplanar with said links the tab of the first of a pair of adjacent links being disposed intermediate the spaced-apart limiting surfaces of the second link, and the tab of the second link being disposed intermediate the spaced-apart limiting surfaces of the first link, at each limiting position of pivotal movement a limiting surface of each tab engaging one of the limiting surfaces intermediate which it is disposed, thereby providing two points of support about said pivot means and reducing the shear force applied to said pivot means.

3. A support according to claim 2, wherein said conduit supporting means comprises a plurality of transverse supporting members each affixed at one end to a link of one of said chains at the other end to a link of the other of said chains, and wherein each supporting member is provided with an aperture adapted to have said conduit disposed therethrough.

4. A support according to claim 2, wherein each of said conduit supporting means comprises a pair of transverse supporting members each connected at one end to a link of one of said chains and at the other end to a link of the other of said chains, one of said supporting members being positioned at one edge of said chain and the other being positioned at the other edge of said chain, said conduit being adapted to be disposed intermediate said supporting members.

5. A support for a flexible conduit, said conduit being adapted to be operated with one end connected to a fixed station and the other end connected to a movable station, said support comprising a pair of chains having conduit supporting means intermediate and affixed to said chains and maintaining said chains in parallel spaced-apart relationship, each of said chains comprising a plurality of interconnected links, pivot means defining a pivotal point common to and connecting together the ends of each pair of adajacent links to provide pivotal movement with respect to each other, each of said links comprising at least two plates, each plate comprising a convexly arcuate end and a concavely arcuate end adapted to mate with the concavely arcuate end and convexly arcuate end, respectively, of adjacent links, the plates of each link being positioned in oppositely oriented direction with the concavely arcuate end of one plate overlapping and affixed to the concavely arcuate end of the other plate, at each end of said link the convexly arcuate end of one plate and the concavely arcuate end of the other plate being substantially contiguous with the surface of a common imaginary cylinder having its axis passing through said pivotal point, each pivotal end of each link being provided with a limit tab having limiting surfaces on both sides thereof and spaced from said pivot means and being provided with means defining a pair of spaced-apart limiting surfaces spaced from said pivot means, the tab of the first of a pair of adjacent links being disposed intermediate the spaced-apart limiting surfaces of the second link, and the tab of the second link being disposed intermediate the spaced-apart limiting surfaces of the first link, at each limiting position of pivotal movement a limiting surface of each tab engaging one of the limiting surfaces intermediate which it is disposed, thereby providing two points of support about said pivot means and reducing the shear force applied to said pivot means.

6. A support according to claim 2 wherein said pivot means comprises pivot pin holes at pivotal points at each end of said links and a pivot pin journaled in said pivot pin holes.

7. A support according to claim 5 wherein each of said means defining a pair of spaced-apart limiting surfaces comprises a peripheral notch provided at the end of one of said plates.

8. A support according to claim 5 wherein said tabs are provided at the periphery of the concave ends of said plate and said peripheral notches are provided at the convex end of said plate.

9. A support according to claim 5 wherein said tabs are provided at the convex ends of said plates and said peripheral notches are provided at the concave ends of said plate.

10. A support for a flexible conduit, said conduit being adapted to be operated with one end connected to a fixed station and the other end connected to a movable station, said support comprising a pair of chains having conduit supporting means intermediate and affixed to said chains and maintaining said chains in parallel spaced-apart relationship, each of said chains comprising a plurality of interconnected links, pivot means defining a pivotal point common to and connecting together the ends of each pair of adjacent links to provide pivotal movement with respect to each other, each pivotal end of each link being provided with a limit tab having limiting surfaces on both sides thereof and spaced from said pivot means and being provided with means defining a pair of spaced-apart limiting surfaces spaced from said pivot means, wherein each link is comprised of three plates, each plate comprising a convexly arcuate end and a concavely arcuate end adapted to mate with the concavely arcuate and convexly arcuate ends, respectively, of adjacent links, two of said plates (14, 24) being oriented in spaced-apart superposition and a third plate (14) being oppositely oriented to said two plates, the concavely arcuate ends (16, 26) of said superposed plates overlapping and including therebetween the concavely arcuate end (16) of said intermediate plate, and means affixing said plates together, the convexly arcuate ends (15, 25) of said outer plates and the concavely arcuate end (16) of said intermediate plate being substantially contiguous with the surface of a common imaginary cylinder whose axis passes through the pivotal point at the end of said link, and the concave ends (16, 26) of said outer plates and the convex end (15) of said inner plate being substantially contiguous with the surface of a common imaginary cylinder whose axis passes through the pivotal point at the other end of said link, said tabs and said means defining a pair of spaced-apart limiting surfaces being positioned at the periphery of the convexly arcuate and concavely arcuate end of said intermediate plate and also being so positioned in at least one of said outer plates, the convex end of each intermediate plate being positioned intermediate the convex ends of an adjacent link, the tab of the first of a pair of adjacent links being disposed intermediate the spaced-apart limiting surfaces of the second link, and the tab of the second link being disposed intermediate the spaced-apart limiting surfaces of the first link, at each limiting position of pivotal movement a limiting surface of each tab engaging one of the limiting surfaces intermediate which it is disposed, thereby providing two points of support about said pivot means and reducing the shear force applied to said pivot means.

11. A support according to claim 10, wherein said pivot means comprises pivot holes provided in the ends of said links and pivot pins jounraled therein.

12. A support according to claim 10, wherein said limit tabs are disposed at the periphery of said concavely arcuate ends and said means defining a pair of spaced-apart limiting surfaces comprise peripheral notches disposed at the periphery of said convexly arcuate ends.

13. A support according to claim 10, wherein said limit tabs are disposed at the convexly arcuate ends of said plates and said means defining a pair of spaced-apart limiting surfaces comprise peripheral notches disposed at the periphery of said concavely arcuate ends.

14. A support for a flexible conduit, said conduit being adapted to be operated with one end connected to a fixed station and the other end connected to a movable station, said support comprising a pair of chains having conduit supporting means intermediate and affixed to said chains and maintaining said chains in parallel spaced-apart relationship, each of said chains comprising a plurality of interconnected links, pivot means defining a pivotal point common to and connecting together the ends of each pair of adjacent links to provide pivotal movement with respect to each other, each pivotal end of each link being provided with a link tab having limiting surfaces on both sides thereof and spaced from said pivot means and being provided with means defining a pair of spaced-apart limiting surfaces spaced from said pivot means, wherein each link is comprised of plates each having two convex ends, and an insert having two concavely arcuate ends is affixed at the mid-portion of said plate, at each pivotal end of each link the convexly arcuate end of said plate and the concavely arcuate end of said insert being substantially contiguous with the surface of a common imaginary cylinder whose axis passes through said pivot point, and wherein said limit tabs and said means defining a pair of spaced-apart limiting surfaces are peripherally disposed at the convexly arcuate ends of said plate and the concavely arcuate ends of said insert member, the tab of the first of a pair of adjacent links being disposed intermediate the spaced-apart limiting surfaces of the second link, and the tab of the second link being disposed intermediate the spaced-apart limiting surfaces of the first link, at each limiting position of pivotal movement a limiting surface of each tab engaging one of the limiting surfaces intermediate which it is disposed, thereby providing two points of support about said pivot means and reducing the shear force applied to said pivot means.

15. A support according to claim 14, wherein said means defining a pair of spaced-apart limiting surfaces comprises a peripheral notch.

16. A support according to claim 14, wherein an additional layer is provided on said chain comprising plates having two convexly arcuate ends and mating insert members having two concavely arcuate ends, the ends of both said plates and said insert member being free of limit tabs and peripheral notches, thereby providing an enclosed chain on at least one side.

17. A chain comprising a plurality of interconnected links, pivot means defining a pivotal point common to and connecting together the ends of each pair of adjacent links to provide pivotal movement with respect to each other, each pivotal end of each link being provided with a limit tab having limiting surfaces on both sides thereof and spaced from said pivot means and means defining a pair of spaced-apart limiting surfaces spaced from said pivot means, said tabs being an integral extension of and being coplanar with said links, the tab of the first of said pair of adjacent links being disposed intermediate the spaced-apart limiting surfaces of the second link, and the tab of the second link being disposed intermediate the spaced-apart limiting surfaces of the first link, at each limiting position of pivotal movement a limiting surface of each tab engaging one of the limiting surfaces intermediate which it is disposed, thereby providing two points of support about said pivot means and reducing the shear force applied to said pivot means.

18. A chain comprising a plurality of interconnected links, pivot means defining a pivotal point common to and connecting together the ends of each pair of adjacent links to provide pivotal movement with respect to each other, each pivotal end of each link being provided with a limit tab having limiting surfaces on both sides thereof and spaced from said pivot means and means defining a pair of spaced-apart limiting surfaces spaced from said pivot means, each of said links comprising at least two plates, each plate comprising a convexly arcuate end and a concavely arcuate end adapted to mate with the concavely arcuate end and convexly arcuate end, respectively, of adjacent links, the plates of each link being positioned in oppositely oriented direction with the concavely arcuate end of one plate overlapping and affixed to the concavely arcuate end of the other plate, at each end of said link the convexly arcuate end of one plate and the concavely arcuate end of the other plate being substantially contiguous with the surface of a common imaginary cylinder having its axis passing through said pivotal point, the tab of the first of said pair of adjacent links being disposed intermediate the spaced-apart limiting surfaces of the second link, and the tab of the second link being disposed intermediate the spaced-apart limiting surfaces of the first link, at each limiting position of pivotal movement a limiting surface of each tab engaging one of the limiting surfaces intermediate which it is disposed, thereby providing two points of support about said pivot means and reducing the shear force applied to said pivot means.

19. A chain according to claim 17 wherein said pivot means comprises pivot pin holes at pivotal points at each end of said links and a pivot pin journaled in said pivot pin holes.

20. A chain according to claim 18 wherein each of said means defining a pair of spaced-apart limiting surfaces comprises a peripheral notch provided at the end of one of said plates.

21. A chain according to claim 20 wherein said tabs are provided at the periphery of the concave ends of said plate and said peripheral notches are provided at the convex end of said plate.

22. A chain according to claim 20 wherein said tabs are provided at the convex ends of said plates and said peripheral notches are provided at the concave ends of said plate.

23. A chain comprising a plurality of interconnected links, pivot means defining a pivotal point common to and connecting together the ends of each pair of adjacent links to provide pivotal movement with respect to each other, each pivotal end of each link being provided with a limit tab having limiting surfaces on both sides thereof and spaced from said pivot means and means defining a pair of spaced-apart limiting surfaces spaced from said pivot means, wherein each link is comprised of three plates, each plate comprising a convexly arcuate end and a concavely arcuate end adapted to mate with the concavely arcuate and convexly arcuate ends, respectively, of adjacent links, two of said plate (14, 24) being oriented in spaced-apart superposition and a third plate (14) being oppositely oriented to said two plates, the concavely arcuate ends (16, 26) of said superposed plates overlapping and including therebetween the concavely arcuate end (16) of said intermediate plate, and means affixing said plates together, the convexly arcuate ends (15, 25) of said outer plates and the concavely arcuate end (16) of said intermediate plate being substantially contiguous with the surface of a common imaginary cylinder whose axis passes through a pivotal point at the end of said link, and the concave ends (16, 26) of said outer plates and the convex end (15) of said inner plate being substantially contiguous with the surface of a common imaginary cylinder whose axis passes through the pivotal point at the other end of said link, said tabs and said means defining a pair of spaced-apart limiting surfaces being positioned at the periphery of the convexly arcuate and concavely arcuate end of said intermediate plate and also being so positioned in at least one of said outer plates, the convex end of each intermediate plate being positioned intermediate the convex ends of an adjacent link, the tab of the first of said pair of adjacent links being disposed intermediate the spaced-apart limiting surfaces of said second link, and the tab of the second link being disposed intermediate the spaced-apart limiting surfaces of the first link, at each limiting position of pivotal movement a limiting surface of each tab engaging one of the limiting surfaces intermediate which it is disposed, thereby providing two points of support about said pivot means and reducing the shear force applied to said pivot means.

24. A chain according to claim 23, wherein said pivot means comprises pivot holes provided in the ends of said links and pivot pins journaled therein.

25. A chain according to claim 23, wherein said limit tabs are disposed at the periphery of said concavely arcuate ends and said means defining a pair of spaced-apart limiting surfaces comprising peripheral notches disposed at the periphery of said convexly arcuate ends.

26. A chain according to claim 23, wherein said limit tabs are disposed at the convexly arcuate ends of said plates and said means defining a pair of spaced-apart limiting surfaces comprising peripheral notches disposed at the periphery of said concavely arcuate ends.

27. A chain comprising a plurality of interconnected links, pivot means defining a pivotal point common to and connecting together the ends of each pair of adjacent links to provide pivotal movement with respect to each other, each pivotal end of each link being provided with a limit tab having limiting surfaces on both sides thereof and spaced from said pivot means and means defining a pair of spaced-apart limiting surfaces spaced from said pivot means, wherein each link is comprised of plates each having two convex ends, and an insert having two concavely arcuate ends is affixed at the mid-portion of said plate, at each pivotal end of each link the convexly arcuate end of said plate and the concavely arcuate end of said insert being substantially contiguous with the surface of a common imaginary cylinder whose axis passes through said pivotal point, and wherein said limit tabs and said means defining a pair of spaced-apart limiting surfaces are peripherally disposed at the convexly arcuate ends of said plate and the concavely arcuate ends of said insert member, the tab of the first of said pair of adjacent links being disposed intermediate the spaced-apart limiting surfaces of the second link, and the tab of the second link being disposed intermediate the spaced-apart limiting surfaces of the first link, at each limiting position of pivotal movement a limiting surface of each tab engaging one of the limiting surfaces intermediate which it is disposed, thereby providing two points of support about said pivot means and reducing the shear force applied to said pivot means.

28. A chain according to claim 27, wherein said means defining a pair of spaced-apart limiting surfaces comprises a peripheral notch.

29. A chain according to claim 27, wherein an additional layer is provided on said chain comprising plates having two convexly arcuate ends and mating insert members having two concavely arcuate ends, the ends of both said plate and said insert member being free of limit tabs and peripheral notches, thereby providing an enclosed chain on at least one side.

30. A support for a flexible conduit, said conduit being adapted to be operated with one end connected to a fixed station and the other end connected to a movable station, said support comprising at least one chain having conduit supporting means affixed thereto, said chain comprising a plurality of interconnected links, pivot means defining a pivotal point common to and connecting together the adjacent ends of each pair of adjacent links to provide a pivotal movement with respect to each other, each pair of interconnected adjacent ends being provided with a pair of limit means angularly spaced apart about said pivot means, each limit means comprising a limit tab having limiting surfaces on both sides provided on one of the links of the pair and a pair of spaced-apart limiting surfaces provided on the other of the links of the pair, said tabs being an integral extension of and being coplanar with said links, both tab and spaced-apart limiting surfaces being radially spaced from the pivot means, the tab of each limit means on one link being disposed between the spaced-apart limiting surfaces on the other link, the arrangement being such that at each limiting position of pivotal movement between the two links a limiting surface of each tab engages one of the limiting surfaces between which it is disposed, thereby providing two points of support about the pivot means and reducing the shear force applied to the pivot means.

31. A conduit support according to claim 30, wherein the two points of support at each limiting position of each pair of chain links are at diametrically opposite positions across the axis of the corresponding pivot means.

32. A conduit support according to claim 30, wherein the links of the chain lie in end to end alignment in a straight line when all the pairs of links are in their corresponding limiting positions.

33. A chain comprising a plurality of interconnected links, pivot means defining a pivotal point common to and connecting together the adjacent ends of each pair of adjacent links to provide pivotal movement with respect to each other, each pair of interconnected adjacent ends being provided with a pair of limit means angularly spaced apart about said pivot means, each limit means comprising a limit tab having limiting surfaces on both sides provided on one of the links of the pair and a pair of spaced-apart limiting surfaces provided on the other of the links of the pair, said tabs being an integral extension of and being coplanar with said links, both tab and spaced-apart limiting surfaces being radially spaced from the pivot means, the tab of each limit means on one link being disposed between the spaced-apart limiting surfaces on the other link, the arrangement being such that at each limiting position of pivotal movement between the two links a limiting surface of each tab engages one of the limiting surfaces between which it is disposed, thereby providing two points of support about the pivot means and reducing the shear force applied to the pivot means.

34. A chain according to claim 33, wherein the two points of support at each limiting position of each pair of links are at diametrically opposite positions across the axis of the corresponding pivot means.

35. A chain according to claim 33, wherein the links of the chain lie in end to end alignment in a straight line when all the pairs of links are in their corresponding limiting positions.

References Cited

UNITED STATES PATENTS

| | | | |
|---|---|---|---|
| 1,094,200 | 4/1914 | Dodge | 74—250 |
| 1,952,885 | 3/1934 | Oakes | 74—250 |
| 3,330,105 | 7/1967 | Weber | 59—78.1 |

FOREIGN PATENTS

| | | |
|---|---|---|
| 1,460,204 | 11/1966 | France. |
| 1,075,974 | 7/1967 | Great Britain. |

CHANCELLOR E. HARRIS, Primary Examiner

U.S. Cl. X.R.

59—78.1; 74—250